(12) United States Patent
Buchhauser et al.

(10) Patent No.: US 9,051,124 B2
(45) Date of Patent: Jun. 9, 2015

(54) DEVICE FOR SUPPLYING MOLDED PARTS IN A BEVERAGE FILLING PLANT

(71) Applicant: Krones AG, Neutraubling (DE)

(72) Inventors: Klaus Buchhauser, Deuerling (DE); Sebastian Klepatz, Zeitlarn (DE); Markus Schönfelder, Deuerling (DE)

(73) Assignee: KRONES AG (DE)

( * ) Notice: Subject to any disclaimer, the term of this patent is extended or adjusted under 35 U.S.C. 154(b) by 0 days.

(21) Appl. No.: 14/084,331

(22) Filed: Nov. 19, 2013

(65) Prior Publication Data
US 2014/0138210 A1    May 22, 2014

(30) Foreign Application Priority Data

Nov. 19, 2012    (DE) ..................... 20 2012 104 466 U

(51) Int. Cl.
*B65G 21/18* (2006.01)
*B65G 15/28* (2006.01)
*B65G 47/51* (2006.01)

(52) U.S. Cl.
CPC ............... *B65G 15/28* (2013.01); *B65G 21/18* (2013.01); *B65G 47/5113* (2013.01); *B65G 47/5136* (2013.01)

(58) Field of Classification Search
CPC .. B65G 21/18; B65G 2207/24; B65G 17/086; B65G 47/261; B65G 17/40
USPC ............................. 198/347.1, 347.3, 778, 396
See application file for complete search history.

(56) References Cited

U.S. PATENT DOCUMENTS

| 3,869,115 | A | * | 3/1975 | Barkley | .................... 198/347.3 |
| 5,454,467 | A | * | 10/1995 | Lago | ............................. 198/831 |
| 8,397,897 | B2 | * | 3/2013 | Bastian et al. | ............. 198/347.1 |
| 8,695,785 | B2 | * | 4/2014 | Balk et al. | ..................... 198/778 |

(Continued)

FOREIGN PATENT DOCUMENTS

| DE | 10 2004 007 590 A1 | 9/2005 |
| DE | 10 2004 007590 | 9/2005 |
| DE | 11 2005 000 890 T5 | 7/2008 |
| DE | 20 2010 012 822 U1 | 11/2010 |

(Continued)

OTHER PUBLICATIONS

Extended European Search Report in EP Application EP 13 193 238.6.

*Primary Examiner* — James R Bidwell
(74) *Attorney, Agent, or Firm* — Haynes and Boone, LLP

(57) ABSTRACT

There is provided devices for supplying molded parts in, for example, a beverage filling plant. An exemplary device may include a circulating conveyor chain for conveying the molded parts, wherein the circular conveyor chain forms a helical conveying track between an intake area and a discharge area, and a buffer for buffering the molded parts, wherein the buffer is disposed at the intake area or at the discharge area. The buffer may include a buffer base area within the helical conveying track for buffering the molded part. Another exemplary device may include a circulating conveyor chain for conveying the molded parts, wherein the circular conveyor chain forms a helical conveying track between an intake area and a discharge area, and wherein the helical conveying track extends around a space which is free of machine parts. The space may be formed to allow for an assembly space or manhole through the device.

19 Claims, 6 Drawing Sheets

(56) References Cited

U.S. PATENT DOCUMENTS

| | | | |
|---|---|---|---|
| 8,770,376 B2* | 7/2014 | Takens | 198/347.1 |
| 2002/0170850 A1 | 11/2002 | Bonham | |
| 2007/0221477 A1* | 9/2007 | Balk | 198/602 |
| 2010/0025190 A1* | 2/2010 | Balk | 198/426 |

FOREIGN PATENT DOCUMENTS

| | | |
|---|---|---|
| EP | 2050696 | 4/2009 |
| WO | WO 2005/102877 | 11/2005 |
| WO | WO 2011/012611 | 2/2011 |

* cited by examiner

DEVICE FOR SUPPLYING MOLDED PARTS IN A BEVERAGE FILLING PLANT

CROSS REFERENCE TO RELATED APPLICATIONS

Pursuant to 35 U.S.C. §119(a)-(d) and (f), this application claims priority to German Patent Application No. 20 2012 104 466.8 filed Nov. 19, 2012 in the German Patent and Trademark Office, which is incorporated by reference in its entirety.

TECHNICAL FIELD

The disclosure relates to a device for supplying molded parts, such as in a beverage filling plant for supplying plastic screw caps, corks, crown caps or preforms, seals or bottles in a beverage filling plant. The molded parts are thereby supplied to a further processing device, for example, a capper.

BACKGROUND

Various conveying devices may convey particular molded parts in beverage filling plants. In conveying plastic screw caps, use is made of so-called air conveyors, in which the molded parts are lifted by means of a suitable stream of air and then conveyed to the required height. However, the conveying devices used need to be precisely configured in order reliably to prevent the molded parts that are blown through the conveying device from sticking or jamming. Moreover, the conveying of the molded parts in such an air conveyor causes the molded parts to reach relatively high speeds, which leads to increased wear of the molded parts.

Waterfall conveyors and conventional belt conveyors may be utilized. However, both need to be relatively elongated in beverage filling plants due to the differences in elevation that must usually be overcome. This requires that they take up a correspondingly large space.

Usually in beverage filling plants, and in particular in the area of conveying plastic screw caps to a corresponding capper, the plastic screw caps are sorted and oriented in the floor area of the plant. The plastic screw caps are then supplied via an elevating conveyor to the actual capper, which comprises the capping heads, and which is configured to attach the caps to the filled containers. A relatively large difference in elevation must usually be overcome here.

The elevating conveyors are usually followed by a buffer for the molded parts, in order to decouple the different process steps, i.e. to decouple the feeding of the molded parts, the sorting of the molded parts, and the actual use of the molded parts in a capper. Here too, the use of a separate buffer consumes space in a beverage filling plant.

Particularly when air conveyors are used, the design of each type of conveying device must be sufficiently exact that falling over, jamming or knocking over of the molded parts that are conveyed over the extent of the conveyor does not occur. This necessary design impedes access to the individual areas of the plant. Such an air conveyor accordingly proves difficult to maintain or clean.

Figure 1:
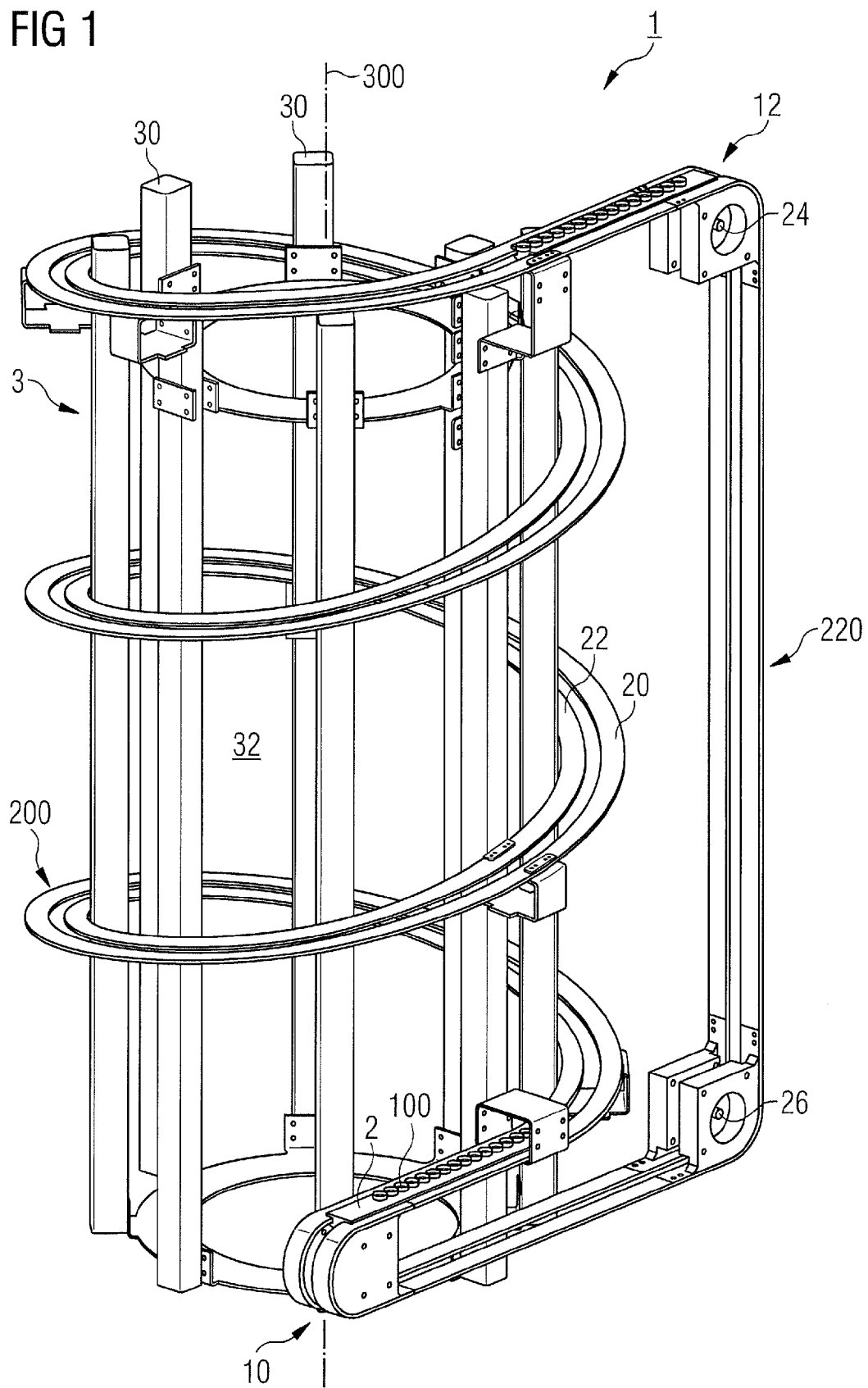
FIG. 1 is an exemplary device for supplying molded parts in a schematic perspective overall view.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In various embodiments, a compact device is provided for supplying molded parts in a beverage filling plant. Additionally, a device is provided for supplying molded parts in a beverage filling plant which exhibits improved maintenance characteristics.

Accordingly, a device for supplying molded parts in a beverage filling plant is provided for supplying plastic screw caps for a downstream processing station in a beverage filling plant, said device comprising an endless circulating conveyor chain for conveying the molded parts, wherein the conveyor chain forms a helical conveying track between an intake area and a discharge area. A buffer for buffering the molded parts is disposed at the intake area and/or at the discharge area.

Because a buffer for buffering the molded parts is provided at the intake area and/or at the discharge area, the device for supplying molded parts can achieve a particularly compact and space-saving design. In particular, in this manner the device can fulfill two functions. The first of these is elevation, by means of which the molded parts are conveyed from a first level, typically a lower level of the plant, to a second level, typically a higher level of the plant. Such conveying from a lower level of the plant to a higher level of the plant may be necessary during the conveying of plastic screw caps, when these need to be conveyed from a floor level, at which the sorting and orientation of the molded parts usually takes place, to a higher level at which they are fed to a capper.

The proposed device may also provide a buffering effect produced by the buffer provided at the intake area and/or at the discharge area. The buffer may be disposed above and/or below the conveying track.

In various embodiments, the outer contour of the buffer vertical to the machine axis corresponds to the outer contour of the corresponding conveying helix or its guides. In other words the buffer, which is disposed above or below the conveying helix, is provided with the same footprint as the device which carries the conveying track. In this manner a particularly compact design can be achieved and the combined effect of the conveying capability of the conveyor chain and the buffer device makes it possible to achieve a particularly effective buffering capability in a compact space, and/or with a device of compact dimensions.

To achieve reliable conveying of the molded parts, the conveyor chain may be coated and/or formed as a conveyor belt in such a manner that a particular conveying angle can be achieved, without the parts slipping or falling over.

The conveying strand of the chain may be helical in form, while the return strand may be straight. By this means the length of the conveyor chain can be less than when the return strand is guided helically below the conveying strand.

In order to achieve a compact and integrated arrangement, the buffer may follow the conveying track and/or be disposed immediately before the conveying track.

Buffering may be achieved if the buffer has a buffer surface for buffering the molded parts. This buffer surface may be horizontally oriented. In order to facilitate the clearing of the buffer surface when depletion of the buffer is desired, the buffer surface may be rotatable, and/or the molded parts may be cleared.

The object is further achieved by a device with the features of claim 8. Advantageous further developments arise from the dependent claims.

Accordingly, a device for supplying molded parts in a beverage filling plant is proposed for supplying plastic screw caps to a downstream processing station in a beverage filling plant, said device comprising an endless circulating conveyor chain for conveying the molded parts, wherein the conveyor chain forms a helical conveying track between an intake area and a discharge area. The conveying track may extend around a space which is free of machine parts.

This design enables an assembly space or manhole to be formed in the center of the device, through which an operator or service technician can gain access to all components of the device, thus facilitating the carrying out of maintenance work. By this means, access can be significantly improved.

The width of the conveyor chain may be configured such that all molded parts that are to be conveyed in a particular area of the plant can be transported on the conveyor chain. Consequently, no conversion of the device is necessary in the case of a change in the type of closure. This results in a particularly high degree of flexibility regarding the use of the device—in contrast to an air conveyor, in which readjustment and re-dimensioning of the individual conveyor sections is necessary if molded parts of different dimensions must be conveyed.

The device may have a modular construction. In various embodiments, the rails or the guiding devices, by means of which the conveyor chain is guided in the device, have a modular form such that one turn of the coil forms a single module. Accordingly, a number of different coils appropriate in each case to the layout of the plant, and appropriate in each case to the required conveying elevation, can be achieved by assembly of an appropriate number of modules. It is further envisaged that various complete modules, each consisting of a specified number of coils and a suitable drive device, are produced in a modular manner such that a combination of two or more such modules can provide the means of overcoming a specified difference in elevation.

The shape of the coil in the helical conveying track can be adapted to the specific necessities of the plant. In particular, the space encompassed by the coils can have a circular, oval, square, rectangular or any other polygonal cross-section. In various embodiments, the helical conveyor is formed with a circular or oval cross-section.

The term "helical" in the present context is further understood as a form of the conveying track which is in the shape of a screw or helix, but whose cross-section can also have any other base area or cross-section. Furthermore, contrary to the usual definition of "helical", it is not necessary for there to be a fixed pitch in the individual coils; instead, it is possible to provide different pitches of the coils within the device, again according to the requirements of the plant. It is however advantageous for the conveying track to have a constant pitch and a rotationally symmetrical cross-section, since this enables the conveying track to guide the material in a more gentle manner without frequent changes of direction.

Such a helical configuration of the conveying device enables flexible adaptation to the applicable inlet and outlet elevations for the corresponding molded parts.

Examples of embodiments are described below with the aid of the figures. In the figures, elements which are identical or similar, or have identical effects, are designated with identical reference signs, and repeated description of these elements is in part dispensed with in the description below, in order to avoid redundancy.

FIG. 1 shows a device 1 for supplying schematically indicated molded parts 100 in a perspective representation. The molded parts 100 are here shown schematically in the form of container closures, plastic screw caps for closing PET bottles.

The conveying device has a conveyor chain 2, schematically represented here by only some of its sections. As can be seen from FIG. 1, the conveyor chain 2 is guided such that it forms a helical conveying track, on which the molded parts 100 are conveyed in order to reach the next processing station.

Figure 2:
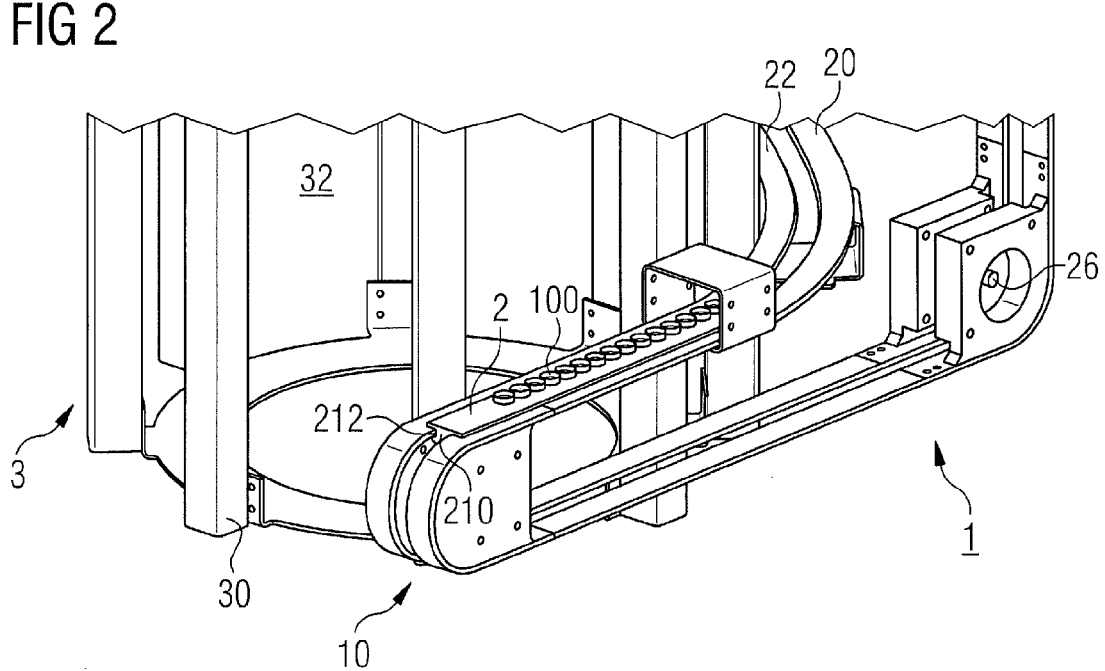
FIG. 2 is an exemplary intake area of the device for supplying molded parts from FIG. 1.

The conveyor chain 2 is guided between suitable guide rails 20, 22. The conveyor chain 2 and the guide rails 20, 22 have complementary guiding areas, by means of which the guiding is achieved. By way of example, possible contours of the conveyor chain 2 and the guide rails 20, 22 can be seen in FIG. 2, which shows schematically a cross-section 210 of the conveyor chain 2, indicating that the conveyor chain 2 has a groove 212 by means of which the conveyor chain 2 is guided in the guide rails 20, 22. In order to form a helical transport track, the guide rails 20, 22 are correspondingly disposed helically parallel to each other.

As indicated in FIG. 1, the molded parts 100 are conveyed from an intake area 10 to a discharge area 12, with the intake area 10 disposed at a first level of the plant and the discharge area 12 disposed at a second level of the plant.

In an exemplary embodiment shown in FIG. 1, the conveying strand 200 of the conveyor chain 2 is guided in a helical track, with the result that the molded parts 100 are conveyed correspondingly from the intake area 10 to the discharge area 12. The return strand 220 is guided back in a straight path, in order to save conveyor length and reduce the unavoidable friction.

The conveyor chain 2 is driven by an electrical drive, which schematically can act on the rollers 24 and/or 26. By means of a suitable electrical drive, which can be operated via a gear mechanism at the optimum operating point, particularly energy-efficient transport is achieved in comparison with a conventional air conveyor, since it is possible to dispense with the use of energy-intensive blowers. Furthermore, the electric motor can be optimally adjusted to the prescribed speed of transport of the conveyor chain 2, and the transporting speeds can be very finely adjusted.

The conveyor chain 2 can be formed as an endless chain with various chain links. The conveyor chain 2 can however also be formed as an endless conveyor belt, which may be manufactured from a plastic material in various embodiments. Such a conveyor belt can either have a coating to prevent the molded parts that are conveyed from slipping, sliding or falling over, or it can be formed without such a coating. For example, a rubber coating, of silicone or natural rubber may suitable to provide anti-slip conveying of the molded parts.

The pitch of each coil of the conveying track is formed such that the molded parts that are to be conveyed are kept securely in position on the conveyor chain 2.

In FIG. 1, the conveying track is shown such that the coils form a helix with equal pitch and a fixed radius. It is therefore a helical form in accordance with the mathematical definition. In the literature, in particular in the patent literature, such a form is often also referred to (falsely in mathematical terms) as a spiral, and the corresponding conveyor is referred to as a spiral conveyor.

Figure 6:
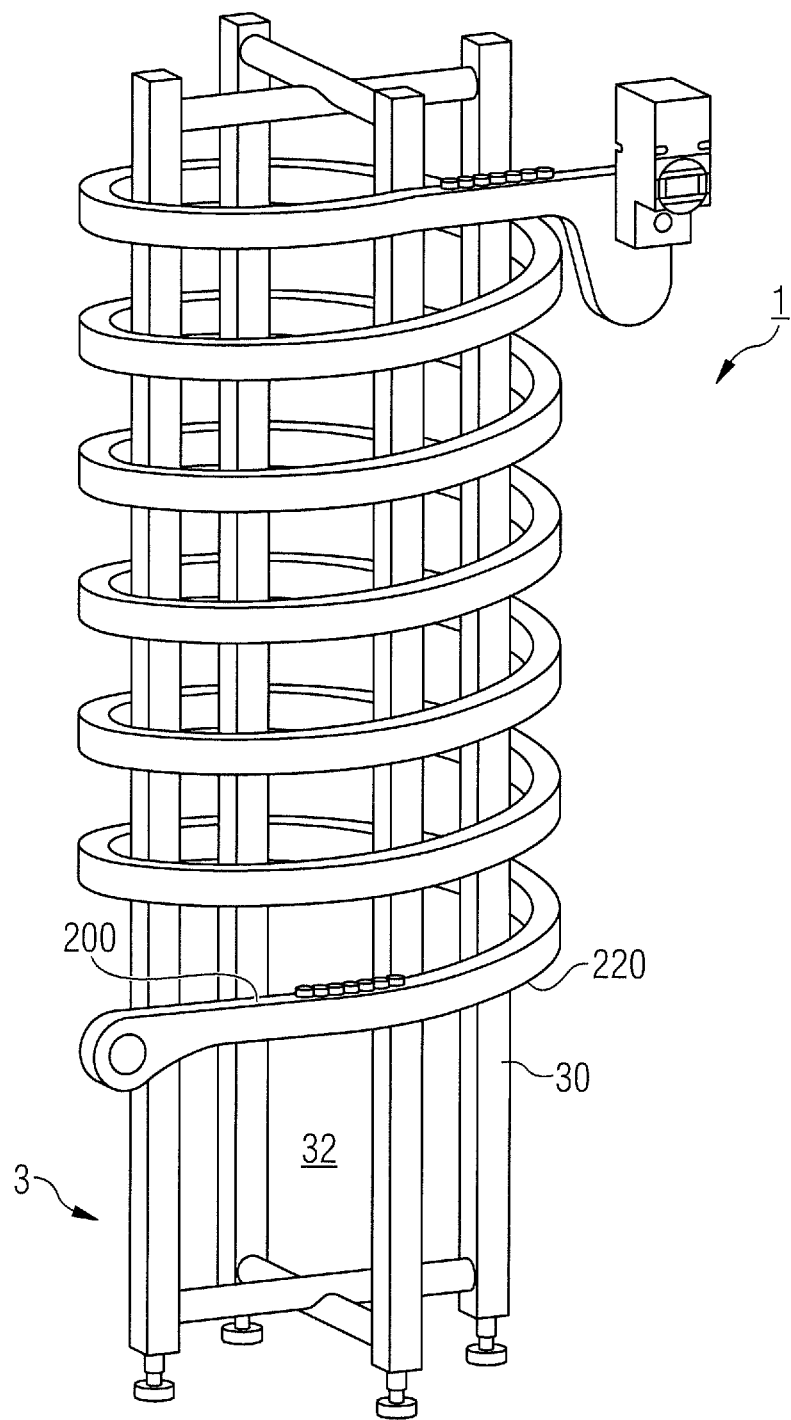
FIG. 6 is a schematic perspective representation of an exemplary device for supplying molded parts in a further embodiment.
Figure 7:
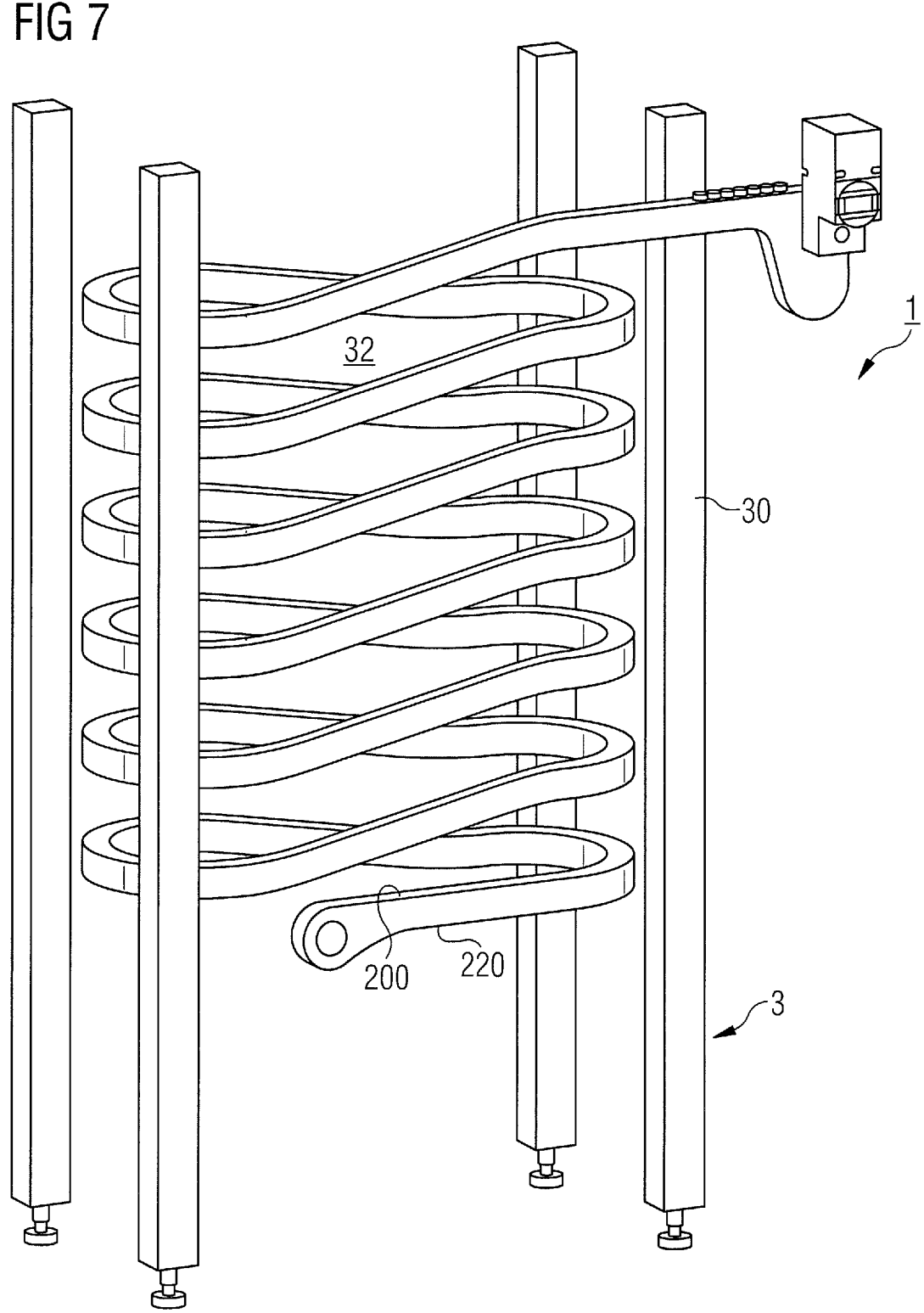
FIG. 7 is a schematic perspective representation of an exemplary device for supplying molded parts in another further embodiment.

In an embodiment which is not shown, both the pitch and the shape of each coil can vary. For example, the coil can have an oval, square, rectangular or any other polygonal horizontal cross-section with respect to the machine axis 300, in order to adapt it to the geometrical constraints that apply within a beverage filling plant. In this it is particularly necessary to take account of the spaces that may be available within a beverage filling plant. Two different designs are shown by way of example in FIGS. 6 and 7, wherein FIG. 6 shows a classic helical form and FIG. 7 an oval cross-section.

If different pitches are used within the transport track, it is of course necessary to ensure that the steepest pitch is configured such that the molded parts 100 that are to be conveyed on the conveyor chain 2 can still be kept securely in position.

In the exemplary embodiment shown in FIG. 1, a machine frame 3 is further provided, with suitable vertical struts 30 to which the guide rails 20, 22 are fixedly attached. The machine frame 3 is formed such that the struts 30 are directly connected to the guide rails 20, 22, and in the inner area a space 32 is thereby formed which is substantially free of machine parts, being occupied by neither machine components nor machine elements of the device 1. Via the space 32 free of machine parts, which is formed in the center of the helical transport track, an operator or service technician can gain immediate access to all components of the device 1. In particular, immediate access to the conveyor chain 2 is possible from this space 32 which is free of machine parts, so that in the event of unforeseen jams or blockages, access can be gained immediately without the need for time-consuming measures to expose the conveying track.

The space 32, which is free of machine parts in the center of the conveying track, allows an operator or service technician to gain access from underneath in one example. This may be useful if the device 1 is installed in a confined space within a beverage filling plant 1, in such a manner that direct access to the components of the plant from outside is either impossible, or possible only after the prior removal of other components of the plant.

Figure 3:
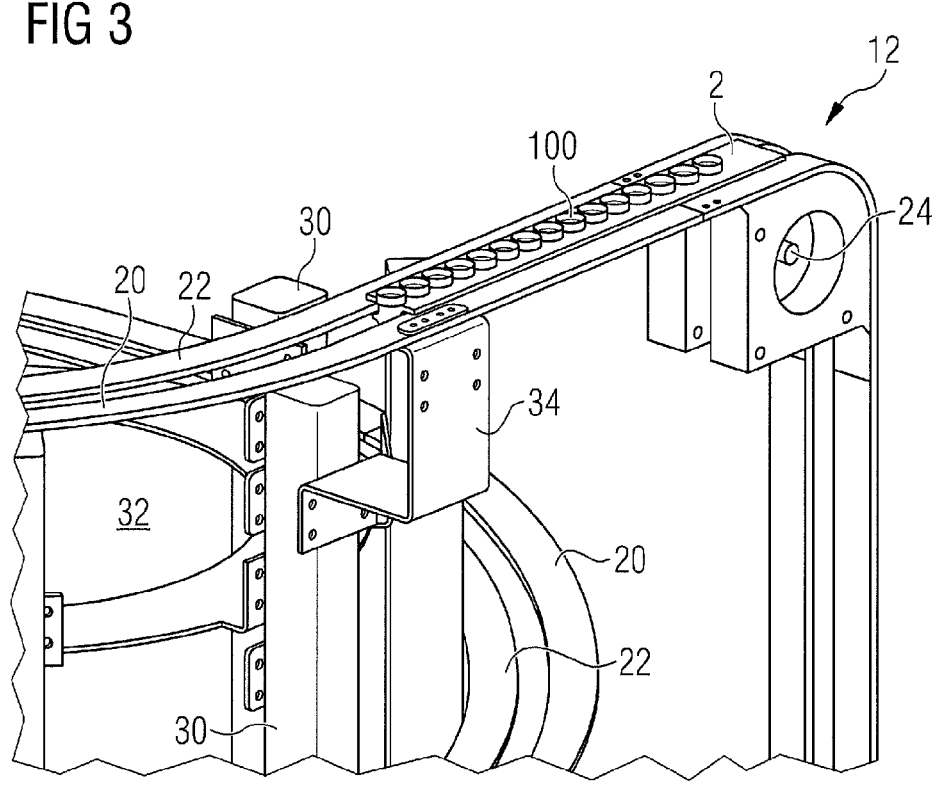
FIG. 3 is an exemplary discharge area of the device for supplying molded parts according to the previous figures.

In FIG. 3, the discharge area 12 is again shown, in this case showing that the guide rails 20, 22 for guiding the conveyor chain 2 are attached to the machine frame 3 from outside by means of brackets 34. The structure is accordingly self-supporting.

It is advantageous to form the individual coils, for example a coil with a 360° turn or a larger coil with a 720° turn, in each case as a separate module. By means of such modules, a device 1 for supplying molded parts 100 with the desired conveying elevation can be erected in a simple manner and with a highly compact design.

Figure 4:
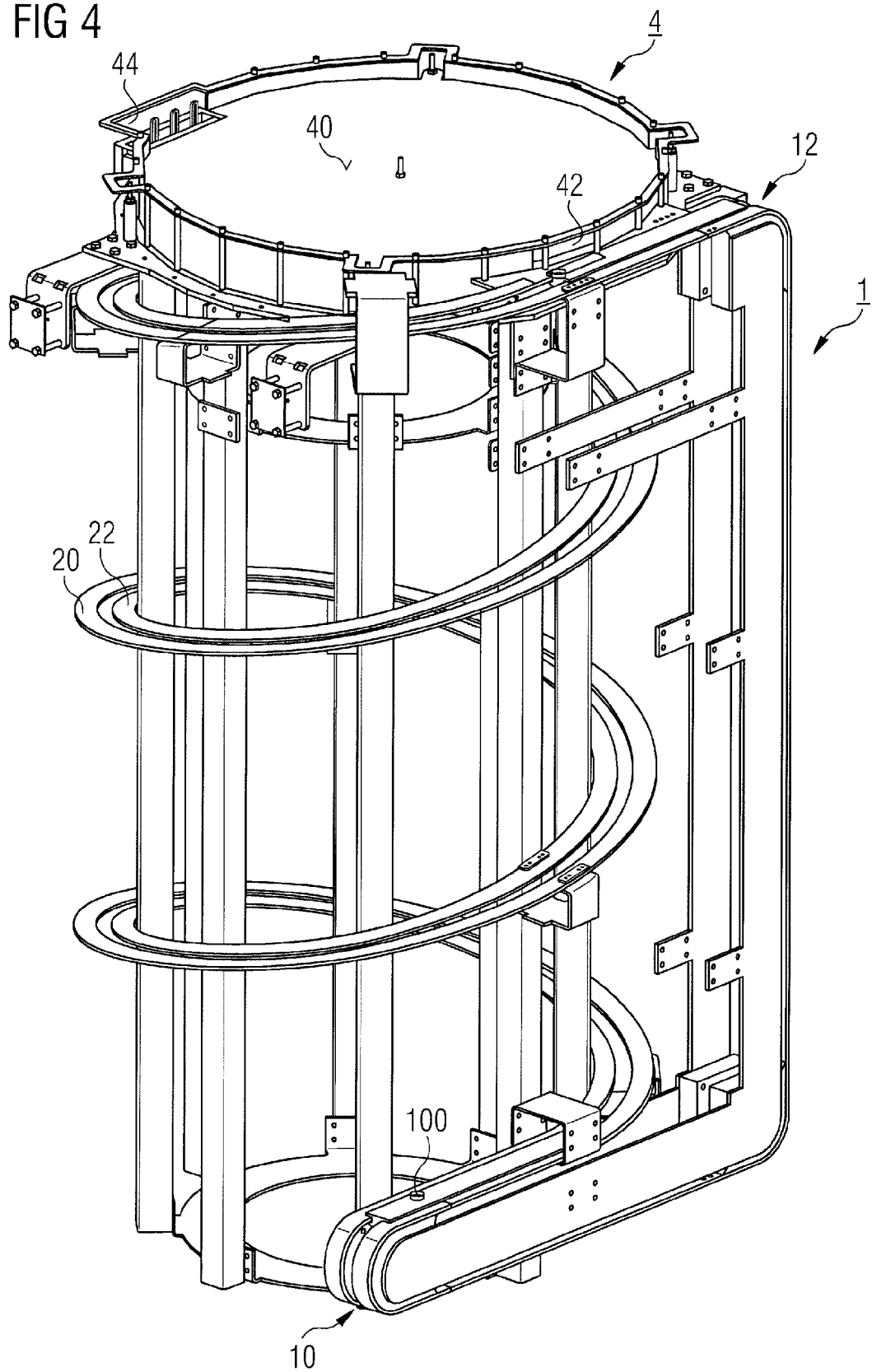
FIG. 4 is an exemplary device for supplying molded parts in combination with a buffer.
Figure 5:
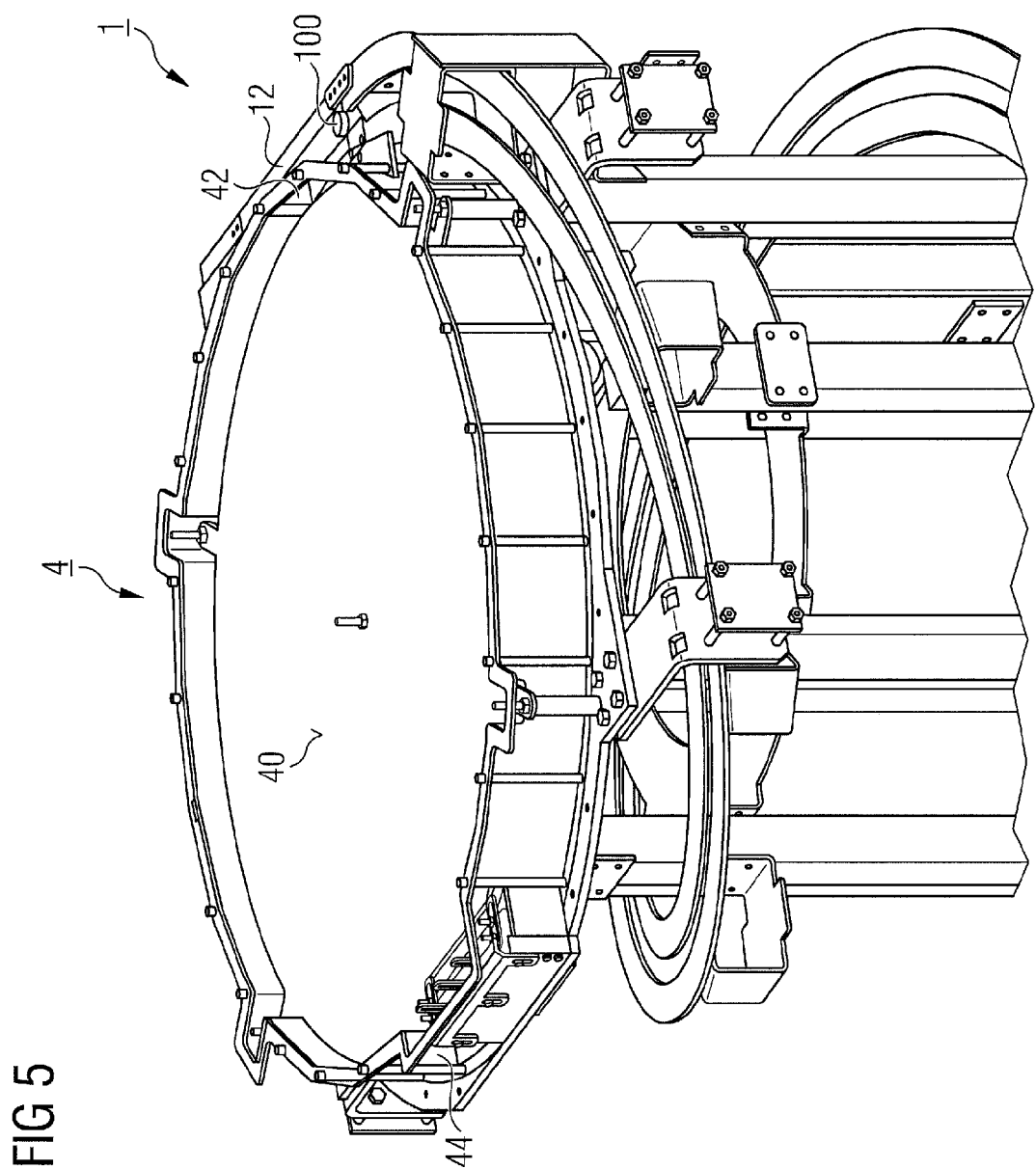
FIG. 5 in a more detailed view of the device of FIG. 4.

In FIGS. 4 and 5, the device 1 is shown with a buffer 4 mounted on its top end, wherein the buffer 4 is provided for the interim storage of the molded parts 100, before they are supplied to the next processing station. The buffer 4 has a horizontally disposed buffer surface 40, which in this embodiment is circular, upon which the molded parts 100 can be buffered. For this purpose the molded parts 100 are conveyed via the conveyor chain 2 to a buffer intake 42, and pushed from there onto the buffer surface 40. Consequently the buffer surface 40 gradually fills with molded parts 100, until these are fed via suitable a buffer discharge 44 to the downstream areas of the plant, for instance a capper disposed downstream in a beverage filling plant.

In the exemplary embodiment shown in FIGS. 4 and 5, the buffer 4 is shown mounted on the top of the conveying device, and it receives the applicable molded parts 100 from the discharge area 12 of the helical conveying track.

The buffer surface 40 of the buffer 4 can be provided in any desired form, wherein conveying devices can also be provided here to convey the molded parts 100 from the buffer intake 42 to the buffer discharge 44. For example, the buffer surface 40 can be configured to be rotatable, or else the buffer surface 40 can be swept by a suitable clearing device, which is not shown here.

The buffer 4 of FIGS. 4 and 5 is formed such that the outer contour of the buffer surface 40 lies within the conveying track's footprint, or within its base area. In other words, neither the buffer surface 40 nor the outer areas of the buffer 4 extend beyond the outer contours of the device 1.

Accordingly, in this manner it is possible to provide a highly compact combination of a conveying device and a buffer, which can be used in combination with beverage filling plants. Molded parts (e.g. container closures from a sorting and orientation station disposed at a first level of the plant) can be conveyed to a second level of the plant. Simultaneously a buffering effect can be provided for the molded parts, which compensates for short-term uptake problems at the discharge side or short-term supply problems at the intake side.

At the buffer discharge 44 of the buffer 4, a further transport device is provided, such as a transport chute, by which the molded parts can be supplied to the next processing device.

The entire run of the conveying track can be enclosed, in order to avoid contamination of the molded parts. Alternatively, the conveying device and/or the buffer 4 could be accommodated in a housing which can be charged with a special atmosphere. In this the housing could have a plurality of chambers, though which the conveyor chain is guided. The chambers can thereby also be charged with different special atmospheres. The term "special atmospheres" is understood to refer in particular to gases which are sterile and/or have sterilizing effects.

The device that is described here can gently handle the molded parts 100 since the molded parts on the conveyor chain 2 are in each case transported at a predetermined distance from each other, or adjoining each other, but with little to no any movement relative to each other. There is little to no relative movement between the molded parts 100 and the conveyor chain 2. This reduces or fully prevents wear of the molded parts 100 on the transport path.

Furthermore, by configuring the width of the conveyor chain 2 to accommodate all common or desired dimensions of molded parts, both conveying and buffering can be achieved with the proposed device independently of the dimensions of the molded parts that are used. Accordingly, there is little to no necessity for adjustment and conversion work to adapt the device to different dimensions.

In various embodiments, a series of the proposed devices can be connected sequentially in order to achieve greater conveying elevations and/or to provide a greater buffer volume. Additionally, the conveyor belt of the device can be fully emptied.

In the buffer 4, the molded parts 100 can be supplied either, as shown in FIGS. 4 and 5, via the tangentially disposed buffer intake 42, or else they can be deposited on the buffer surface 40 from directly above. The appropriate guiding depends on the installation and/or layout situation within the beverage filling plant.

In order to achieve access for a technician to the space 32 inside the conveying track which is free of machine parts, a climbing aid (e.g. a ladder), can be disposed within the space 32 which is free of machine parts, by means of which the service technician can easily gain access to all locations inside the conveyor belt.

In the embodiments shown, the buffer 4 has a closed buffer surface 40. Alternatively, a manhole (not shown) can be disposed in the buffer surface 40, for example, at a center of buffer 4. Through this an operator can reach both the buffer surface 40 and adjacent assemblies in order to rectify faults.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A device for supplying molded parts, the device comprising:
   a circulating conveyor chain for conveying the molded parts, wherein the circulating conveyor chain forms a helical conveying track between an first intake area and a discharge area; and
   a buffer for buffering the molded parts, wherein
   the buffer is disposed at the discharge area,
   the buffer comprises a buffer base area which does not extend beyond a track base area of the helical conveying track, and
   the buffer base area corresponding to outer contours of the circulating conveyor chain.

2. The device of claim 1, wherein the buffer is disposed within the track base area of the helical conveying track.

3. The device of claim 1, wherein the buffer comprises a buffer surface for buffering the molded parts.

4. The device of claim 3, wherein the buffer surface is rotatable.

5. The device of claim 3, wherein the buffer surface is cleared of the molded parts by a clearing device.

6. The device of claim 3, wherein the buffer surface is horizontally oriented.

7. The device of claim 1, wherein the buffer is disposed at a second intake area of a second device.

8. The device of claim 7, wherein the second device comprises a capping device.

9. The device of claim 1, wherein the helical conveying track is enclosed from the first intake area to the discharge area.

10. The device of claim 1, wherein the buffer is disposed above the helical conveying track.

11. The device of claim 10, wherein the buffer comprises a removable manhole cover.

12. A device for supplying parts, the device comprising:
    a circulating conveyor chain for conveying the parts; and
    a buffer for buffering the parts, wherein
    the circulating conveyor chain forms a helical conveying track between an intake area and a discharge area,
    the helical conveying track extends around a space defining a conveying track base area,
    the buffer is disposed at the discharge area and comprises a buffer base area that corresponds to outer contours of the circulating conveyor chain, and
    the buffer does not extend beyond the conveying track base area of the helical conveying track.

13. The device of claim 12, wherein the space is formed as an assembly space or manhole.

14. The device of claim 12, wherein the helical conveyor chain is coated to have a non-slip grip with the molded parts.

15. The device of claim 12, wherein the helical conveyor chain comprises a conveyor belt.

16. The device of claim 12, wherein the helical conveyor chain comprises a helical conveying strand and a straight return strand.

17. The device of claim 12, wherein the helical conveyor chain comprises guide rails.

18. The device of claim 17, wherein the guide rails comprise modular sections of the helical conveying track.

19. The device of claim 12, wherein the helical conveying track comprises one of a circular, oval, square, rectangular and polygonal horizontal cross-section with respect to the machine axis.

* * * * *